United States Patent
Na et al.

(10) Patent No.: US 7,842,411 B2
(45) Date of Patent: Nov. 30, 2010

(54) SEPARATOR AND FUEL CELL STACK USING THE SAME

(75) Inventors: Young-Seung Na, Suwon-si (KR); Jun-Won Suh, Suwon-si (KR); Kyoung-Hwan Choi, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 67 days.

(21) Appl. No.: 12/213,693

(22) Filed: Jun. 23, 2008

(65) Prior Publication Data

US 2009/0087718 A1      Apr. 2, 2009

(30) Foreign Application Priority Data

Oct. 1, 2007  (KR) ...................... 10-2007-0098772

(51) Int. Cl.
   *H01M 2/14*  (2006.01)
   *H01M 2/18*  (2006.01)
   *H01M 8/00*  (2006.01)

(52) U.S. Cl. ...................................... 429/34

(58) Field of Classification Search ... 429/34; H01M 8/02

See application file for complete search history.

(56) References Cited

U.S. PATENT DOCUMENTS 5,108,849 A * 4/1992 Watkins et al. ............... 429/30

FOREIGN PATENT DOCUMENTS

| JP | 2006-221853 | | 8/2006 |
|----|----|----|----|
| JP | 2007-123106 | | 5/2007 |
| JP | 2007-207730 | | 8/2007 |
| JP | 2007207730 A | * | 8/2007 |
| KR | 1020040011286 | | 2/2004 |
| KR | 1020040011286 A | * | 2/2004 |
| KR | 10-2004-0038869 | | 5/2004 |
| KR | 1020060065776 | | 6/2006 |
| KR | 1020060065776 A | * | 6/2006 |
| KR | 1020070037207 | | 4/2007 |

* cited by examiner

*Primary Examiner*—Jerry Lorengo
*Assistant Examiner*—Jared Wood
(74) *Attorney, Agent, or Firm*—Robert E. Bushnell, Esq.

(57) ABSTRACT

Disclosed is a separator for a fuel cell stack. The separator includes a plate having a first opening and a second opening on a surface thereof. A field or a channel is formed on the surface of the plate. The field has a first end and a second end. A field inlet is formed on the surface of the plate and connects the first end of the field to the first opening, and a field outlet is formed on the surface of the plate and connects the second end of the field to the second opening. An area of a cross-section of the field inlet, which is cut perpendicular to the surface of the plate, is smaller than an area of a cross-section of the field outlet, which is cut perpendicular to the surface of the plate.

20 Claims, 5 Drawing Sheets

SEPARATOR AND FUEL CELL STACK USING THE SAME

CLAIM OF PRIORITY

This application makes reference to, incorporates the same herein, and claims all benefits accruing under 35 U.S.C. §119 from an application earlier filed in the Korean Intellectual Property Office on Oct. 1, 2007 and there duly assigned Serial No. 10-2007-0098772.

BACKGROUND OF THE INVENTION

1. Field of the Invention

The present invention relates to a separator for a fuel cell stack, which is capable of facilitating flow of a fluid by controlling the difference in an internal pressure of a stack, and a fuel cell stack using the same.

2. Discussion of Related Art

A fuel cell is a generator system capable of directly converting a chemical reaction, which involves a fuel such as hydrogen, into an electrical energy. Such a fuel cell may be used for a small power source of notebook computers and portable electronic equipment, a power source for housings, a portable power source used in yachts or camping sites, a power source for electric vehicles, generators in large buildings, etc. As a basic structure of the fuel cell, a unit cell (hereinafter, referred to as a "cell") generally outputs a voltage of 0.4 to 0.9 V. Accordingly, the most fuel cells are manufactured in a stacked structure where a plurality of cells is electrically coupled in parallel so as to obtain a desired voltage.

The fuel cell stack may be manufactured in a structure where a plurality of electrolyte membranes, membrane electrode assemblies and separators are stacked. The membrane electrode assembly (MEA) includes an anode and a cathode that are coupled respectively to both sides of an electrolyte membrane. And, the separators are disposed in both sides of the membrane electrode assembly, and functions to distribute and supply a fuel and/or an oxidant to the membrane electrode assembly. Such a stack structure is widely used since it is easily manufactured and has excellent performance.

Meanwhile, in a fuel cell stack that uses a liquid fuel, the liquid fuel flows into a separator through an inlet and flows out of the separator through an outlet during a normal operation of the fuel cell stack. However, gas is generated though the electrochemical reactions of the fuel during the operation of the fuel cell stack, and the volume of the gas rapidly increases causing increase of pressure of the gas. In this case, pressure of an outlet, through which the liquid fuel flows out of the separator, can be higher than pressure of an inlet, through which the liquid fuel flows into the separator. Therefore, the liquid fuel can flow backwards into the inlet, which is called a back flow phenomenon. In this case, the fuel may be non-uniformly supplied to each of the cell in the stack, and performances of the fuel cell may also deteriorate.

In order to solve the above problems, there is an alternative method for installing a first manifold and a second manifold in a manner that a cross-sectional area of the first manifold is smaller than that of the second manifold by modifying a structure of a manifold. However, this alternative method has a problem that a fuel may not be sufficiently supplied to cells disposed in the innermost of the first manifold due to the narrower cross-sectional area of the first manifold. Accordingly, it is difficult to apply this alternative method to a real fuel cell system, and there is also no effect to prevent a back flow of fluids.

SUMMARY OF THE INVENTION

Accordingly, the present invention is proposed to solve the drawbacks of the contemporary design of the fuel cell stack. Therefore an object of the present invention is to provide a separator for a fuel cell that is capable of guiding a flow of a fuel in a direction overcoming backwards pressure that is generated in an inner part of a fuel cell stack during the operation of the fuel cell stack.

Also, another object of the present invention is to provide a fuel cell stack capable of preventing a back flow of a fuel. The fuel cell stack of the present invention reduces deviation in supply of the fuel among cells, and improves performances of a fuel cell.

The present invention are not particularly limited to the above-mentioned objects, and therefore it is evident that these or other objects of the present invention may be clearly understood from the following description of the present invention to those skilled in the art.

One embodiment of the present invention is achieved by providing a separator for a fuel cell stack. The separator includes a plate having a first opening and a second opening on a surface thereof. A field is formed on the surface of the plate, and the field has a first end and a second end. A field inlet is formed on the surface of the plate and connects the first end of the field to the first opening. A field outlet is formed on the surface of the plate and connects the second end of the field to the second opening. An area of a cross-section of the field inlet, which is cut perpendicular to the surface of the plate, is smaller than an area of a cross-section of the field outlet, which is cut perpendicular to the surface of the plate.

The first opening and the second opening may have the same size.

The first end of the field may include a stepped portion in order to make an area of a cross-section of the first end of the field, which is cut perpendicular to the surface of the plate, greater than an area of the cross-section of the field inlet. The cross-section of the field inlet may have a substantially constant area while extending to connect the first end of the field to the first opening. An area of the cross-section of the field inlet may increase as proceeding from the first opening to the first end of the field.

The field may have a meandering shape.

The field may include a plurality of subfields, and the field inlet may include a plurality of subfield inlets. Each of the subfields has a first end and a second end. One of the subfield inlets connects a first end of one of the subfields to the first opening, and another of the subfield inlets connects a first end of another of the subfields to the first opening. The field outlet may include a plurality of subfield outlets. One of the subfield outlets connects a second end of the one of the subfields to the second opening, and another of the subfield outlets connects a second end of the another of the subfields to the second opening.

The field may include a plurality of subfields. Each of the subfields has a first end and a second end. The field inlet connects the first end of the each of the subfields to the first opening, and the field outlet connects the second end of the each of the subfields to the second opening. Each of the subfields may have a meandering shape.

Another embodiment of the present invention is achieved by providing a fuel cell stack that includes a membrane electrode assembly for producing electricity, a separator disposed on a side the membrane electrode assembly, and a fixing unit for holding the membrane electrode assembly and the separator. The membrane electrode assembly includes an anode catalyst layer and a cathode catalyst layer. The separator distributes a fuel to the anode catalyst layer of the membrane electrode assembly, or distributes an oxidant to the cathode catalyst layer of the membrane electrode assembly. The separator includes a plate having a first opening and a second opening on a surface thereof. A field is formed on the surface of the plate, and the field has a first end and a second end. A field inlet is formed on the surface of the plate and connects the first end of the field to the first opening. A field outlet is formed on the surface of the plate and connects the second end of the field to the second opening. An area of a cross-section of the field inlet, which is cut perpendicular to the surface of the plate, is smaller than an area of a cross-section of the field outlet, which is cut perpendicular to the surface of the plate.

The fuel cell stack may operate in a direct fluid fuel cell mode.

BRIEF DESCRIPTION OF THE DRAWINGS

The patent application file contains at least one drawing executed in color. Copies of this patent of patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Hereinafter, certain exemplary embodiments according to the present invention will be described with reference to the accompanying drawings. Further, elements that are not essential to the complete understanding of the invention are omitted for clarity. Also, like reference numerals refer to like elements throughout. And, it is considered that the same components have the reference numerals as same as possible although the components are shown in different drawings. Furthermore, the actual thickness or size of the layers may be different since the thickness or size is exaggerated in the accompanying drawings for convenience sake of their descriptions.

Figure 1:
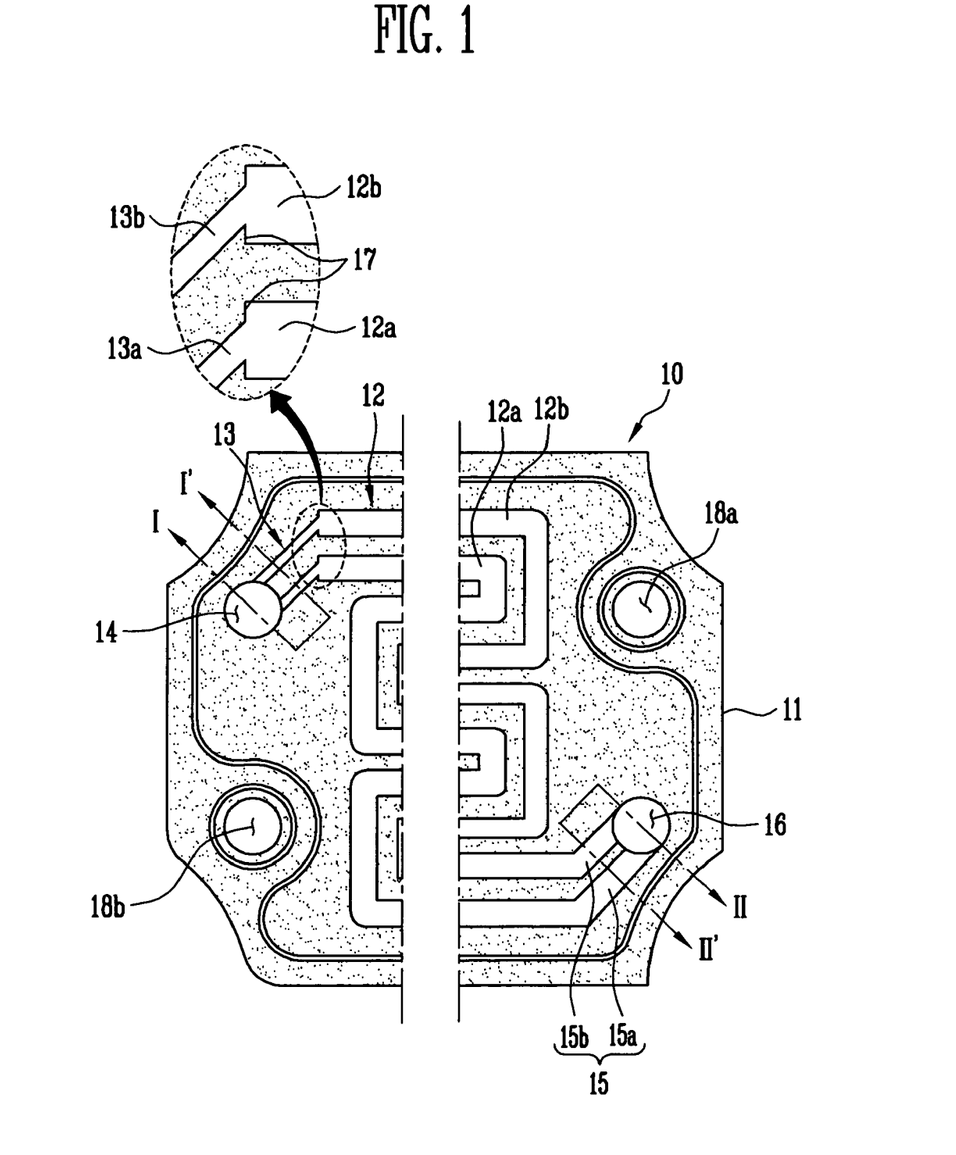
FIG. 1 is a plane view showing a separator for a fuel cell constructed as one exemplary embodiment of the present invention.
Figure 2A:
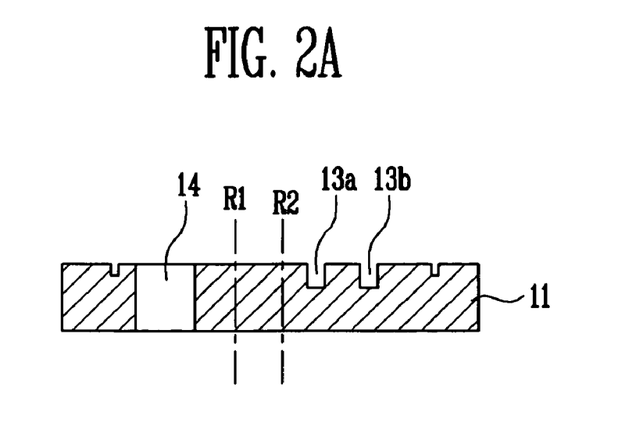
FIG. 2A is a cross-sectional view of a portion of the separator taken from a line I-I' as shown in FIG. 1.
Figure 2B:
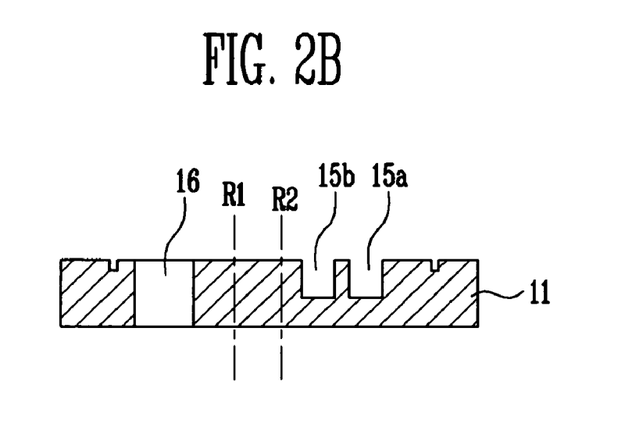
FIG. 2B is a cross-sectional view of a portion of the separator taken from a line II-II' as shown in FIG. 1.

FIG. 1 is a plane view showing a separator for a fuel cell constructed as one exemplary embodiment of the present invention. FIG. 2A is a cross-sectional view of a portion of the separator taken from a line I-I' as shown in FIG. 1. FIG. 2B is a cross-sectional view of a portion of the separator taken from a line II-II' as shown in FIG. 1. In FIGS. 2A and 2B, reference symbols R1 and R2 correspond respectively to regions that are approximately bent vertically to lines I-I' and II-II' as shown in FIG. 1.

Referring to FIGS. 1, 2A and 2B, a separator 10 is disposed at both sides of a fuel cell, and supplies a fuel, supplied from the outside, to an anode of the fuel cell, or distributes and supplies an oxidant, supplied from the outside, to a cathode of the fuel cell. The separator 10 discharges gases generated in the fuel cell. Also, the separator 10 functions as a connector for electrically coupling adjacent cells to each other.

Figure 4:
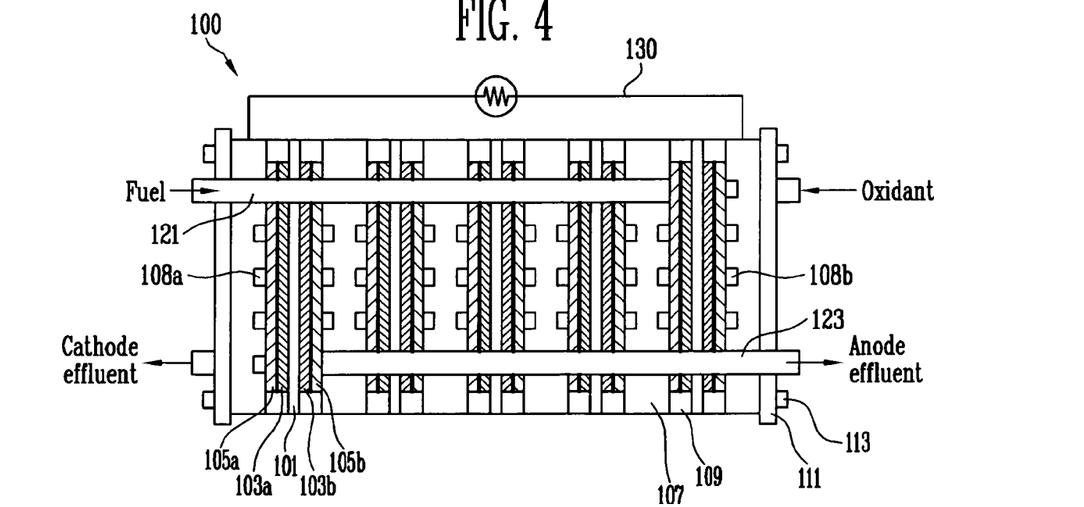
FIG. 4 is a cross-sectional view showing a fuel cell stack that includes a separator of the present invention.

The separator 10 includes a plate 11, a field 12 installed on one surface of the plate 11. The surface of the pate 11 has a first opening 14, a second opening 16, a third opening 18a, and a fourth opening 18b. The first opening 14 is formed as a part of a first manifold, and is coupled to a field inlet 13 of the field 12. The second opening 16 is formed as a part of a second manifold, and is coupled to a field outlet 15 of the field 12. The third opening 18a is formed as a part of a third manifold, and a fourth opening 18b as part of a fourth manifold. The first manifold and the second manifold are shown in FIG. 4, which is a cross-sectional view of the fuel cell stack, and referred to as reference numeral 121 and 123, respectively.

The plate 11 may be made of graphite, carbon, surface-treated metals having excellent corrosion resistance, or alloys having a strong corrosion resistance. If a stainless steel is used as the material of the separator 11, a structure in which conductive micro-particles are passed through a passivity layer and extruded may be provided in a surface of the stainless steel in order to improve conductivity.

The field 12 is a channel through which a fuel is distributed to an active region of the anode of the cell, and through which gases generated in the anode are distributed. The field 12 may have a structure to effectively distribute a fuel to the active region of the anode. For example, the field 12 may have a meandering (meandering or wound) shape. If the separator 10 is installed in the cathode side of the cell, the field 12 is used as a channel for distributing an oxidant to the active region of the cathode of the cell, and for discharging fluids formed in the cathode. The field 12 has a first end and a second end. The field inlet 13 connects the first end of the field 12 to the first opening 14, and the field outlet 15 connects the second end of the field 12 to the second opening 16.

Also, the field 12 is preferably installed to include a plurality of subfields 12a and 12b for the purpose of the effective fuel supply. In this case, the field 12 includes a first subfield 12a and a second subfield 12b. The first subfield 12a communicates with the first opening 14 through a subfield inlet 13a, and communicates with the second opening 16 through a field outlet 15a. The second subfield 12b communicates with the first opening 14 through another subfield inlet 13b, and communicates with the second opening 16 through another field outlet 15b. In this exemplary embodiment, two subfield inlets 13a and 13b connects first ends of the subfields 12a and 12b to the first opening 14, respectively. Also, two subfield outlets 15a and 15b connects second ends of the subfields 12a and 12b to the second opening 16.

Each of the subfield inlets 13a and 13b has a constant cross-sectional area while extending to connect the respective first end of the subfield to the first opening, and is formed at a constant length. Herein, a cross-section of a subfield inlet is a section that is cut substantially perpendicular to the surface of the plate 11, on which the subfield is formed. An area of a cross-section of a subfield corresponds to an area formed when an open upper portion of a subfield is imaginarily covered. The definition of the area of the cross-section is applied to field inlets, field outlets, subfield outlets, subfields, and fields. A length of a subfield inlet is a size of a subfield inlet along a direction in which the subfield inlet extends to connect an end of the field to an opening.

The subfield inlets 13a and 13b are extended and installed between the first opening 14 and a first end of the field 12. Cross-sectional areas of the subfield inlets 13a and 13b are smaller than those of the subfields 12a and 12b, respectively. For example, a cross-sectional area of each of the subfields 12a and 12b is about 1.0 mm to 1.5 mm (width)×0.3 mm (height), and a sectional area of each of the subfield inlets 13a and 13b may be about 0.1 mm to 0.6 mm (width) ×0.3 mm (height). At this time, a length of the two subfield inlets 13a and 13b may be about 5.0 mm to 15 mm, and can be determined according to the distribution of pressure. Herein, the width of the subfield (or a field) is a dimension of a side of the cross-section of the subfield that is substantially parallel to surface of the plate 11, and height is a dimension of another side of the cross-section of the subfield that is substantially parallel to the surface of the plate 11. Here, each of the two subfields 12a and 12b preferably has a constant sectional area while proceeding along its path from the first end to the second end.

Each of the subfield outlet 15a and the other field outlet 15b has a constant cross-sectional area, and is formed at a constant length. The subfield outlet 15a and the other field outlet 15b are extended and installed between the second opening 16 and a second end of the subfield 12a and 12b, respectively. The subfield outlets 15a and 15b have substantially the same cross-sectional area as those of the subfield 12a and 12b, respectively.

A first opening 14 forms a first manifold of the anode inlet when the separator 10 is installed in one surface of the cell to form a stack structure, and a second opening 16 forms a second manifold of the anode outlet when the separator 10 is installed in one surface of the cell to form a stack structure. Similarly, a third opening 18a forms a third manifold of the cathode inlet when the separator 10 is installed in one surface of the cell to form a stack structure, and a fourth opening 18b forms a fourth manifold of the cathode outlet when the separator 10 is installed in one surface of the cell to form a stack structure. For this exemplary embodiment, an area of the first opening 14 is substantially identical to that of the second opening 16. The first and second manifolds may be referred to as anode manifolds, and the third and fourth manifolds may be referred to as cathode manifolds.

The first end of a field (or a subfield) may have a stepped portion 17 to make the cross-sectional area of the field (or the subfield) greater than the cross-sectional area of the field inlet (or the subfield inlet) that is connected to the field (or the subfield).

According to the configuration of the above mentioned separator, it is possible to solve the problem regarding the difference in pressure of the anode manifold, thereby prevent a fluid from flowing backward to the anode inlet due to the high pressure in the anode outlet.

Figure 3:
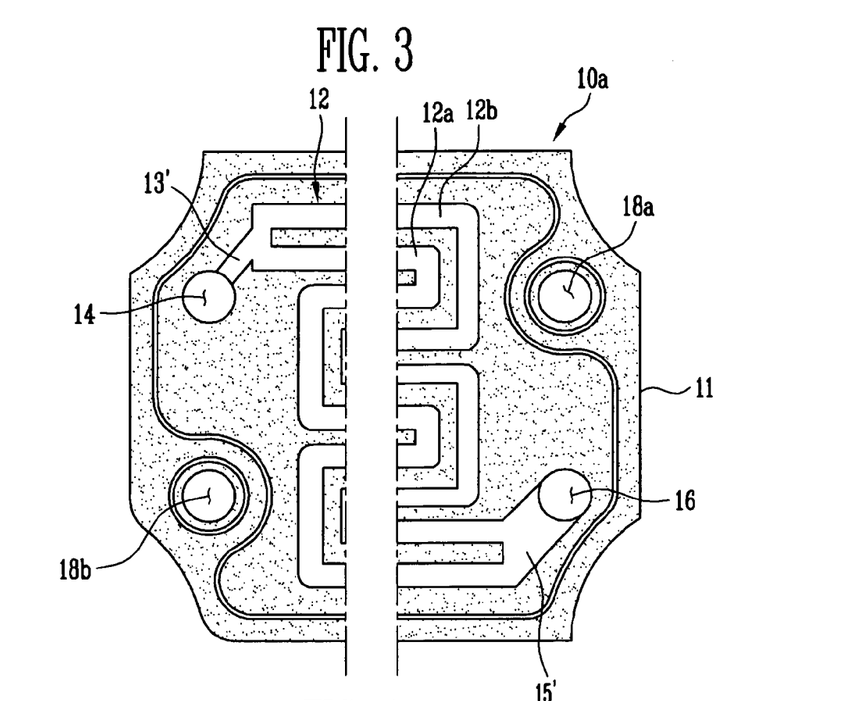
FIG. 3 is a plane view showing a separator constructed as another embodiment of the present invention.

FIG. 3 is a plane view showing a separator constructed as another embodiment of the present invention. Referring to FIG. 3, the separator 10a includes a plate 11, a field 12 installed in one surface of the plate 11. The surface of the plate 11 has a first opening 14, a second opening 16, a third opening 18a, and a fourth opening 18b. The first opening 14 is formed as a part of a first manifold, and is coupled to an field inlet 13' of the field 12. The second opening 16 is formed as a part of a second manifold, and is coupled to a filed outlet 15' of the field 12. The third opening 18a is formed as a part of a third manifold, and a fourth opening 18b as a part of a fourth manifold.

The separator 10a of this embodiment is configured in a manner that one field inlet 13' connects both of the first ends of the two subfields 12a and 12b to the first opening 14. At this time, comparing the separator 10a of FIG. 3 with the separator 10 as shown in FIG. 1, the field inlet 13' has approximately the same cross-sectional area as the sum of the cross-sectional areas of the two subfields 12a and 12b. In one embodiment, the cross-sectional area of the field inlet 13' decreases as proceeding from the first end of the field 12 to the first opening 14. The cross-sectional area at the portion, in which the field inlet 13' is coupled to the first opening 14, can be about a half of the sum of the sectional areas of the two subfields 12a and 12b. In another embodiment, the first end of the field 12 includes a stepped portion, and therefore, the cross-sectional area at the first end of the field 12 suddenly decreases to about a half of the sum of the sectional areas of the two subfields 12a and 12b. In this case, the cross-sectional area of the field inlet 13' can be maintained as a constant while proceeding from the first end of the field 12 to the first opening 14.

The separator 10a is different from the separator 10 as shown in FIG. 1 in a manner that one field outlet 15' connects the second ends of the two subfields 12a and 12b to the second opening 16.

For this embodiment, regions of the field inlet 13' and the field outlet 15', arranged in both ends of the two subfields 12a and 12b, has a considerably wider width, compared to other regions of the fields. Therefore, when the fields are stacked with fuel cells, loosened parts of the fuel cells may fall down or intrude into the wider field inlet or outlet, which leads to clogging of the fuel path. Accordingly, this embodiment is preferably applied to a fuel cell stack having a structure in which parts of the fuel cells are tightly held or larger than the widths of the field inlets and outlets, to prevent the parts from falling down in the regions of the field inlet 13' and the field outlet 15'.

FIG. 4 is a cross sectional view showing a fuel cell stack that includes the separator of the present invention. Referring to FIG. 4, the fuel cell stack 100 includes an electrolyte membrane 101, an anode catalyst layer 103a, a cathode catalyst layer 103b, an anode support layer 105a, a cathode support layer 105b, a separator 107, a gasket 109, an end plate 111, and a fixing unit 113. Also, the fuel cell stack 100 has a first manifold 121 installed in the anode inlet, and a second manifold 123 installed in the anode outlet.

The electrolyte membrane 101 has an ion exchange function to transfer hydrogen ions generated in the anode electrode to the cathode electrode. The electrolyte membrane 101 may be manufactured with a solid polymer with a thickness of 50 to 200 μm, and particularly a hydrogen ion conductive polymer. The hydrogen ion conductive polymer includes a fluorine-based polymer, a ketone-based polymer, a benzimidazole-based polymer, an ester-based polymer, an amide-based polymer, an imide-based polymer, a sulfone-based polymer, a styrene-based polymer, hydrocarbon polymer, etc.

The anode catalyst layer 103a and the cathode catalyst layer 103b function to facilitate the oxidation/reduction reaction so that a fuel supplied from the outside can be rapidly oxidized chemically, and oxygen supplied from the outside can be rapidly reduced chemically. And, the anode support layer 105a and the cathode support layer 105b function to support the catalyst layers 103a and 103b, to disperse a fuel, water, air and the like, and to collect generated electric current, and to prevent loss of materials in the catalyst layer.

A single unit is composed of the above mentioned electrolyte membrane 101, an anode catalyst layer 103a and an anode support layer 105a disposed in one surface of the electrolyte membrane 101, and a cathode catalyst layer 103b and a cathode support layer 105b disposed in the other surface of the electrolyte membrane 101. This single unit is so called a membrane electrode assembly (MEA).

The separator 107 includes the separator as described above referring to FIG. 1 or 3. The separator 107 may be installed in a shape of a bipolar plate having a fuel flow field 108a formed in one surface thereof and an oxidant flow field 108b formed in the other surface thereof. Also, the separator 107 may be installed in a shape of a mono-polar plate having a fuel or an oxidant flow field formed only in one surface thereof.

The gasket 109 is mainly disposed between the electrolyte membrane 101 and the separator 107, and function to intercept fluid leakage or inflow of foreign substance between the separator 107 and the anode catalyst layer 103a, or between the separator 107 and the cathode catalyst layer 103b. The gasket 109 may be manufactured with materials having excellent elasticity and excellent stress maintenance to the heat cycle. For example, materials of the gasket 109 that may be used herein include rubber, acrylic, silicone materials, or thermoplastic elastomers (TPE), metals, etc.

The end plate 111 supports both ends of the stacks. The end plate 111 may have an influx hole (not shown) for coupling the first manifold 121 to an external unit, and an efflux hole (not shown) for coupling the second manifold 123 to another external unit. Also, the end plate 111 may have a fixing hole (not shown) for coupling the fixing unit 113 to the end plate 111. Materials of the end plate 111 that can be used herein include metals such as aluminum, alloys such as stainless steel, polymer composite materials such as plastics, ceramic composite material, fiber-reinforced polymer composite material, etc.

The fixing unit 113 functions to support a stack by giving a constant pressure between the pair of the end plates 111. A screw-coupling structure using a bolt and the like, a bundling structure using a string and the like, or a molding structure using thermosetting resin and the like may bed used for the fixing unit 113.

An operation principle of the fuel cell stack 100 will be described in detail, as follows. In the following description, the fluid fuel cell using an aqueous methanol solution as a fuel is described as one example.

If an aqueous methanol solution is supplied to the anode through the first manifold 121, and an oxidant is supplied to the cathode through the third manifold, a fuel supplied to the anode catalyst layer 103a through the separator 107 is converted into hydrogen ion (H$^+$), electron (e$^-$), and carbon dioxide by the oxidation reaction. The hydrogen ion is transferred through the hydrogen ion conductive electrolyte membrane 101, and moves to the cathode catalyst layer 103b. The electron moves to the cathode catalyst layer 103b through an external circuit 130. The oxidant supplied to the cathode catalyst layer 103a through the separator 107 functions to form water and heats by reducing the hydrogen ion into oxygen in the oxidant and the electron.

Meanwhile, the carbon dioxide generated in the anode catalyst layer 103a is discharged through the second manifold 123. At this time, a pressure of the second manifold 123 increases to a higher level than that of the first manifold 121 in a contemporary fuel cell stack due to the increase in volume of the aqueous methanol solution as an un-reacted fuel and the carbon dioxide as a gas generated in the stack. Therefore, it is possible to have the fuel fluid flow backward in the contemporary fuel cell stack because of the higher pressure at the portion around the second manifold 123. In the fuel cell stack of the present invention, however, a region in which the fuel flow field 108a of the separator 107 is coupled to the first manifold 121 is formed in a smaller sectional area than the other region of the field. Accordingly, it is possible to prevent a fuel fluid from flowing backwards in the fuel cell stack of the present invention. The specific structure of the separator 107 works as a stepped pressure portion or a check valve functioning portion, which prevents a fluid from flowing back in the fuel flow field 108a.

The electrochemical reaction in the direct fluid fuel cell using the aqueous methanol solution as the fuel may be represented by the following Equation 1.

Equation 1

Figure 5A:
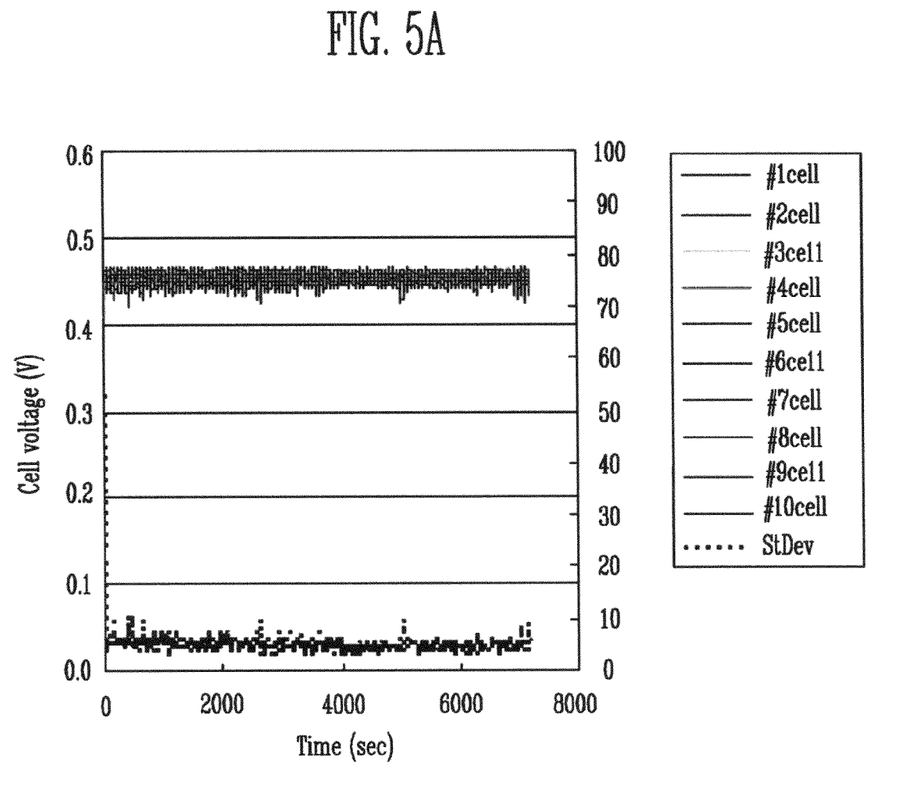
FIG. 5A shows a graph of output characteristics of a fuel cell stack constructed according to the principles of the present invention.
Figure 5B:
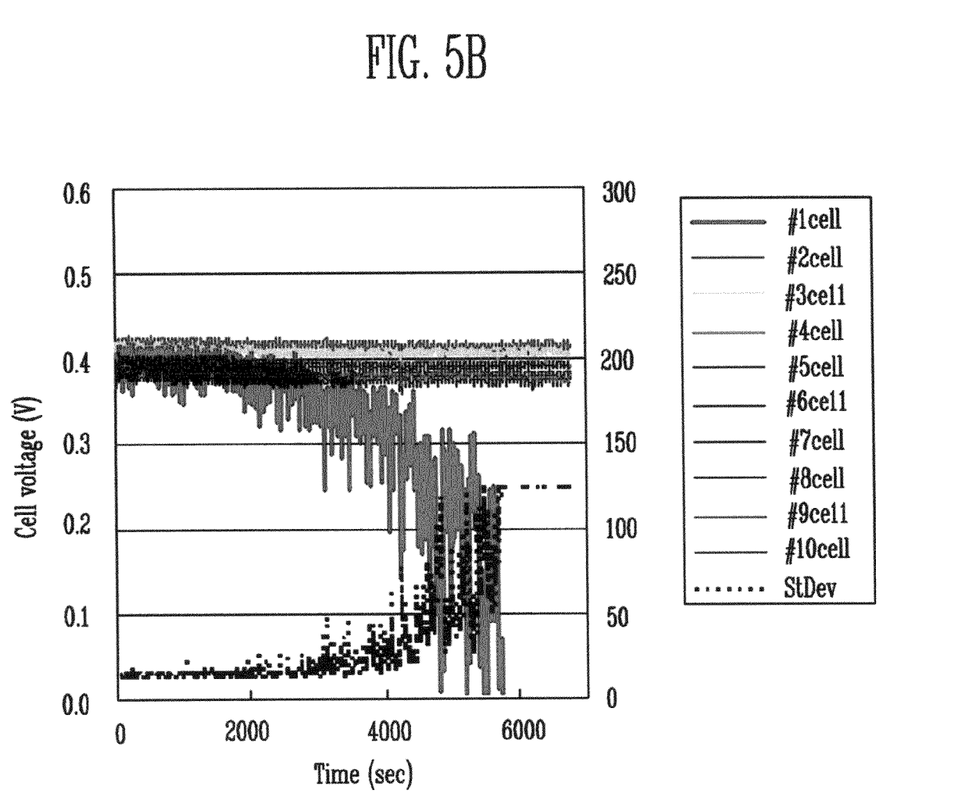
FIG. 5B shows a graph of output characteristics of a contemporary fuel cell stack.

FIGS. 5A and 5B are graphs illustrating an output characteristic of the fuel cell stack of the present invention and that of a contemporary fuel cell stack, respectively.

The fuel cell stack of the present invention includes separators that are prepared according to the principles of the present invention. The separator has a field inlet whose cross-sectional area is smaller than the cross-sectional area of a field, as described above referring to the embodiments of the present invention. While the fuel cell stack of the present invention was being operated, voltage of each of the cells of the fuel cell stack was measured. The measurement was conducted up to 7000 seconds. FIG. 5A shows the measured cell voltages for cells (from the first cell to the tenth cell) and standard deviation of the cell voltages. As shown in FIG. 5A, the voltages of the ten cells are almost the same, which was measured to be about 0.45 V. Furthermore, the cell voltage of each of the cells is uniform over the period of 7000 seconds.

The contemporary fuel cell stack is prepared with separators, in which a cross-sectional area of a field inlet of a separator is almost the same as a cross-sectional area of a field. While the contemporary fuel cell stack was being operated, voltage of each of the cells of the contemporary fuel cell stack was measured. FIG. 5B shows the measured cell voltages for cells (from the first cell to the tenth cell of the contemporary fuel cell stack) of the contemporary fuel cell stack, and standard deviation of the cell voltages. As shown in FIG. 5B, at the beginning of the measurement, the cell voltage of each of cells is measured to be about 0.4 V. However, the voltage of the first cell, which is disposed in the innermost of the first manifold, abruptly decreased after about 2000 seconds, and the first cell stopped operation after about 5500 seconds. In FIG. 5B, the cell voltage of the first cell is represented by a thick solid line that drops from about 0.4 V to about 0.1 V.

According to the present invention as described above, the first opening and the second opening are designed in a manner that the size of the first opening forming the first manifold of the anode inlet can be the same as that of the second opening forming the second manifold of the anode outlet. At this time, the separator used is designed in a manner that the sectional area in a region in which one end of the field is coupled to the first opening is smaller than that of the sectional area in which the other end of the field is coupled to the second opening. Accordingly, the fuel cell stack of the present invention may be useful to easily control the difference in internal pressure that may be produced during operation of the stack, and to decrease pressure deviation between the cells to improve performance of the stack by easily supplying a fuel to the innermost of the first manifold.

The fuel cell stack of the present invention may be useful to easily control the difference in internal pressure by adjusting the size of a coupling region of the separator coupled to the manifold of the anode inlet. In addition, the fuel cell stack of the present invention may be useful to reduce deviation between cells stacked in a fuel cell stack by using the separator, and to improve reliability and performance of the fuel cell stack since the fuel is easily supplied to the end cells disposed in the innermost of the manifold in the anode inlet.

Although exemplary embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A separator for a fuel cell stack, comprising:
   a plate having a first opening and a second opening on a surface thereof;
   a field formed on the surface of the plate, the field having a first end and a second end;
   a field inlet formed on the surface of the plate and connecting the first end of the field to the first opening; and
   a field outlet formed on the surface of the plate and connecting the second end of the field to the second opening, an area of a cross-section of the field inlet at an interface between the first opening and the field inlet being smaller than an area of a cross-section of the field outlet at a planar interface between the second opening and the field outlet, an area of a cross-section of the first end of the field at an interface between the first end of the field and the field inlet being greater than an area of a cross-section of the field inlet at the planar interface between the first end of the field and the field inlet.

2. The separator according to claim 1, wherein the first opening and the second opening have substantially the same size.

3. The separator according to claim 1, wherein the first end of the field includes a stepped portion at the interface between the first end of the field and the field inlet.

4. The separator according to claim 3, wherein the cross-section of the field inlet has a substantially constant area while extending to connect the first end of the field to the first opening.

5. The separator according to claim 1, wherein an area of the cross-section of the field inlet increases as proceeding from the first opening to the first end of the field.

6. The separator according to claim 1, wherein the field has a meandering shape.

7. The separator according to claim 1, wherein the field includes a plurality of subfields and the field inlet includes a plurality of subfield inlets, each of the subfields having a first end and a second end, one of the subfield inlets connecting a first end of one of the subfields to the first opening, another of the subfield inlets connecting a first end of another of the subfields to the first opening.

8. The separator according to claim 7, wherein the field outlet includes a plurality of subfield outlets, one of the subfield outlets connecting a second end of the one of the subfields to the second opening, another of the subfield outlets connecting a second end of the another of the subfields to the second opening.

9. The separator according to claim 1, wherein the field includes a plurality of subfields, each of the subfields having a first end and a second end, the field inlet connecting the first end of the each of the subfields to the first opening, the field outlet connecting the second end of the each of the subfields to the second opening.

10. The separator according to claim 9, wherein each of the subfields has a meandering shape.

11. A fuel cell stack comprising:
    a membrane electrode assembly for producing electricity, the membrane electrode assembly including an anode catalyst layer and a cathode catalyst layer;
    a separator disposed on a side the membrane electrode assembly, the separator distributing a fuel to the anode catalyst layer of the membrane electrode assembly or distributing an oxidant to the cathode catalyst layer of the membrane electrode assembly; and
    a fixing unit for holding the membrane electrode assembly and the separator, wherein the separator comprises:
      a plate having a first opening and a second opening on a surface thereof;
      a field formed on the surface of the plate, the field having a first end and a second end;
      a field inlet formed on the surface of the plate and connecting the first end of the field to the first opening; and
      a field outlet formed on the surface of the plate and connecting the second end of the field to the second opening, an area of a cross-section of the field inlet at an interface between the first opening and the field inlet being smaller than an area of a cross-section of the field outlet at a planar interface between the second opening and the field outlet, an area of a cross-section of the first end of the field at an interface between the first end of the field and the field inlet being greater than an area of a cross-section of the field inlet at the planar interface between the first end of the field and the field inlet.

12. The fuel cell stack according to claim 11, wherein the first opening and the second opening have substantially the same size.

13. The fuel cell stack according to claim 11, wherein the first end of the field includes a stepped portion at the interface between the first end of the field and the field inlet.

14. The fuel cell stack according to claim 13, wherein the cross-section of the field inlet has a substantially constant area while extending to connect the first end of the field to the first opening.

15. The fuel cell stack according to claim 11, wherein an area of the cross-section of the field inlet increases as proceeding from the first opening to the first end of the field.

16. The fuel cell stack according to claim 11, wherein the field has a meandering shape.

17. The fuel cell stack according to claim 11, wherein the field includes a plurality of subfields and the field inlet includes a plurality of subfield inlets, each of the subfields having a first end and a second end, one of the subfield inlets connecting a first end of one of the subfields to the first opening, another of the subfield inlets connecting a first end of another of the subfields to the first opening.

18. The fuel cell stack according to claim 11, wherein the field outlet includes a plurality of subfield outlets, one of the subfield outlets connecting a second end of the one of the subfields to the second opening, another of the subfield outlets connecting a second end of the another of the subfields to the second opening.

19. The fuel cell stack according to claim 11, wherein the field includes a plurality of subfields, each of the subfields having a first end and a second end, the field inlet connecting the first end of the each of the subfields to the first opening, the field outlet connecting the second end of the each of the subfields to the second opening.

20. The fuel cell stack according to claim 11, wherein the stack operates in a direct fluid fuel cell mode.

* * * * *